(12) United States Patent
Walser et al.

(10) Patent No.: US 9,052,717 B1
(45) Date of Patent: *Jun. 9, 2015

(54) WATERCRAFT SPEED CONTROL DEVICE

(75) Inventors: Michael W. Walser, Comfort, TX (US); Kennon H. Guglielmo, San Antonio, TX (US); Kenneth R Shouse, Fair Oaks Ranch, TX (US); Joseph Grogan, San Antonio, TX (US)

(73) Assignee: Enovation Controls, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/965,556

(22) Filed: Dec. 10, 2010

Related U.S. Application Data

(63) Continuation-in-part of application No. 11/056,848, filed on Feb. 11, 2005, now Pat. No. 7,229,330, and a continuation-in-part of application No. 11/811,616, filed on Jun. 11, 2007, now Pat. No. 7,494,393, and a (Continued)

(51) Int. Cl.
*B60L 3/00* (2006.01)
*G06F 7/00* (2006.01)

(Continued)

(52) U.S. Cl.
CPC ...... *G05D 1/0206* (2013.01); *B60W 2710/0644* (2013.01); *F02D 2250/18* (2013.01);

(Continued)

(58) Field of Classification Search
CPC ....... G05D 1/0206; G05D 1/02; G05D 1/027; B60W 10/06; B60W 10/08; B60W 2510/0695; B60W 2510/081; B60W 2510/088; B60W 2520/10; B60W 2520/106; B60W 2710/0666; B60W 2710/0644; G01C 21/20; G01C 21/16; G01C 21/165; F02D 2250/18
USPC ......... 701/1, 21, 54, 79, 84, 90, 93, 408, 412, 701/468, 500, 502, 507; 440/1, 2, 84, 87, 440/90; 180/170
See application file for complete search history.

(56) References Cited

U.S. PATENT DOCUMENTS 3,748,466 A 7/1973 Sibley
3,921,446 A * 11/1975 Ludloff .................... 73/862.192

(Continued)

FOREIGN PATENT DOCUMENTS

JP H1153700 2/1999
WO WO0129512 4/2001

OTHER PUBLICATIONS

Race Technology Speedbox 200Hz non-contact speed sensor brochure; Race Technology, Ltd., Strelley Hall, Main Street, Strelley, Nottingham, England NG8 6PE.

(Continued)

*Primary Examiner* — Jack W Keith
*Assistant Examiner* — Chuong P Nguyen
(74) *Attorney, Agent, or Firm* — Haynes and Boone LLP; William B. Nash; Joseph R. Mencher

(57) ABSTRACT

An automatic speed control system that provides desired watercraft velocity over land. The coupled algorithms correct engine speed and torque using inertia based measurements, GPS, and tachometer measurements, and the corrections are augmented and enhanced by velocity/speed and torque/speed relationships that are dynamically and adaptively programmed with real-time data collected during replicated operations of the watercraft in specified conditions.

21 Claims, 13 Drawing Sheets

Related U.S. Application Data continuation-in-part of application No. 11/811,605, filed on Jun. 11, 2007, now Pat. No. 7,491,104, and a continuation-in-part of application No. 11/811,606, filed on Jun. 11, 2007, now Pat. No. 7,485,021, and a continuation-in-part of application No. 11/811,604, filed on Jun. 11, 2007, now Pat. No. 7,465,203, and a continuation-in-part of application No. 11/811,617, filed on Jun. 11, 2007, now Pat. No. 7,494,394, and a continuation-in-part of application No. 11/903,208, filed on Sep. 19, 2007, now abandoned, and a continuation-in-part of application No. 12/391,101, filed on Feb. 23, 2009, now Pat. No. 7,877,174.

(60) Provisional application No. 60/543,610, filed on Feb. 11, 2004.

(51) Int. Cl.
  *B63H 21/21* (2006.01)
  *G05D 1/02* (2006.01)
  *B60W 10/06* (2006.01)
  *B60W 10/08* (2006.01)
  *G01C 21/16* (2006.01)

(52) U.S. Cl.
  CPC .............. *B60W10/06* (2013.01); *B60W 10/08* (2013.01); *B60W 2710/0666* (2013.01); *B60W 2520/10* (2013.01); *G01C 21/16* (2013.01)

(56) References Cited

U.S. PATENT DOCUMENTS

| | | | |
|---|---|---|---|
| 4,392,122 A | 7/1983 | Hocken | |
| 4,422,423 A | 12/1983 | Sugiyama et al. | |
| 4,939,661 A | 7/1990 | Barker et al. | |
| 5,074,810 A | 12/1991 | Hobbs | |
| 5,110,310 A | 5/1992 | Hobbs | |
| 5,142,473 A | 8/1992 | Davis | |
| 5,276,660 A | 1/1994 | Lee | |
| 5,355,855 A | 10/1994 | Saikalis | |
| 5,367,999 A | 11/1994 | King et al. | |
| 5,369,589 A | 11/1994 | Steiner | |
| 5,404,341 A | 4/1995 | Horiguchi | |
| 5,458,104 A | 10/1995 | Tuckey | |
| 5,577,474 A * | 11/1996 | Livshiz et al. | 123/352 |
| 5,694,337 A | 12/1997 | Macken | |
| 5,700,171 A | 12/1997 | Horton | |
| 5,731,788 A | 3/1998 | Reeds | |
| 5,808,671 A | 9/1998 | Maycock et al. | |
| 5,828,979 A | 10/1998 | Polivka | |
| 5,828,987 A * | 10/1998 | Tano et al. | 702/150 |
| 5,848,373 A | 12/1998 | DeLorme et al. | |
| 5,884,213 A | 3/1999 | Carlson | |
| 5,904,131 A | 5/1999 | O'Neill et al. | |
| 5,905,713 A | 5/1999 | Anderson et al. | |
| 5,928,040 A * | 7/1999 | Wharton | 440/1 |
| 6,035,252 A * | 3/2000 | Dixon et al. | 701/102 |
| 6,041,762 A | 3/2000 | Sirosh et al. | |
| 6,041,765 A | 3/2000 | O'Neill et al. | |
| 6,131,552 A | 10/2000 | Paielli et al. | |
| 6,157,297 A | 12/2000 | Nakai | |
| 6,169,495 B1 | 1/2001 | Koike | |
| 6,176,224 B1 | 1/2001 | Wu et al. | |
| 6,227,918 B1 | 5/2001 | Wharton | |
| 6,259,381 B1 | 7/2001 | Small | |
| 6,267,105 B1 | 7/2001 | Bertossi | |
| 6,273,771 B1 | 8/2001 | Buckley et al. | |
| 6,283,240 B1 | 9/2001 | Beever | |
| 6,289,278 B1 | 9/2001 | Endo et al. | |
| 6,312,301 B1 | 11/2001 | Kennedy | |
| 6,340,005 B1 | 1/2002 | Keast et al. | |
| 6,353,781 B1 * | 3/2002 | Spivak | 701/21 |
| 6,401,446 B1 | 6/2002 | Gibbons | |
| 6,456,910 B1 | 9/2002 | Roe | |
| 6,485,341 B1 * | 11/2002 | Lanyi et al. | 440/87 |
| 6,507,785 B1 | 1/2003 | Stefan et al. | |
| 6,517,396 B1 | 2/2003 | Into | |
| 6,573,486 B1 | 6/2003 | Ratkovic | |
| 6,577,932 B1 | 6/2003 | Van Beurden et al. | |
| 6,701,905 B1 | 3/2004 | Gaskins | |
| 6,722,302 B2 | 4/2004 | Matsuda et al. | |
| 6,763,226 B1 | 7/2004 | McZeal | |
| 6,779,752 B1 | 8/2004 | Ratkovic | |
| 6,826,478 B2 | 11/2004 | Riewe et al. | |
| 6,845,321 B1 | 1/2005 | Kerns | |
| 6,855,020 B2 * | 2/2005 | Kaji | 440/84 |
| 6,864,807 B2 | 3/2005 | Todoriki et al. | |
| 6,884,128 B2 * | 4/2005 | Okuyama et al. | 440/1 |
| 6,959,240 B2 | 10/2005 | Okamoto | |
| 6,997,763 B2 * | 2/2006 | Kaji | 440/1 |
| 7,027,808 B2 | 4/2006 | Wesby | |
| 7,031,224 B2 | 4/2006 | Reifer | |
| 7,143,363 B1 | 11/2006 | Gaynor et al. | |
| 7,150,430 B2 | 12/2006 | Silansky | |
| 7,214,110 B1 | 5/2007 | Ehlers et al. | |
| 7,229,330 B2 | 6/2007 | Walser et al. | |
| 7,344,377 B2 | 3/2008 | Bozicevic | |
| 7,361,067 B1 * | 4/2008 | Smedema | 440/1 |
| 7,465,203 B2 | 12/2008 | Walser et al. | |
| 7,485,021 B2 | 2/2009 | Walser et al. | |
| 7,491,104 B2 | 2/2009 | Walser et al. | |
| 7,494,393 B2 | 2/2009 | Walser et al. | |
| 7,494,394 B2 | 2/2009 | Walser et al. | |
| 7,841,440 B2 | 11/2010 | Liu | |
| 7,877,174 B2 | 1/2011 | Walser et al. | |
| 7,883,383 B2 | 2/2011 | Larsson | |
| 7,934,983 B1 | 5/2011 | Eisner | |
| 8,006,668 B1 | 8/2011 | Guglielmo et al. | |
| 8,136,506 B1 | 3/2012 | Guglielmo et al. | |
| 8,145,372 B2 | 3/2012 | Walser et al. | |
| 8,176,897 B1 | 5/2012 | Guglielmo et al. | |
| 2001/0032236 A1 | 10/2001 | Lin | |
| 2001/0055063 A1 | 12/2001 | Nagai et al. | |
| 2002/0022927 A1 | 2/2002 | Lemelson | |
| 2003/0036814 A1 | 2/2003 | Middleton | |
| 2003/0060973 A1 | 3/2003 | Mathews et al. | |
| 2004/0056779 A1 | 3/2004 | Rast | |
| 2004/0150557 A1 | 8/2004 | Ford | |
| 2005/0176312 A1 | 8/2005 | Walser et al. | |
| 2005/0191916 A1 | 9/2005 | Bozicevic | |
| 2005/0222933 A1 | 10/2005 | Wesby | |
| 2006/0038718 A1 | 2/2006 | Arakane | |
| 2006/0074540 A1 | 4/2006 | Braunberger | |
| 2006/0089794 A1 | 4/2006 | DePasqua | |
| 2006/0176216 A1 | 8/2006 | Hipskind | |
| 2008/0003899 A1 | 1/2008 | Walser | |
| 2008/0009205 A1 | 1/2008 | Walser | |
| 2008/0009206 A1 | 1/2008 | Walser | |
| 2008/0085642 A1 | 4/2008 | Guglielmo et al. | |
| 2008/0133131 A1 | 6/2008 | Poreda et al. | |
| 2009/0209153 A1 * | 8/2009 | Walser et al. | 440/87 |
| 2010/0087110 A1 | 4/2010 | Berg | |

OTHER PUBLICATIONS

Matching of ground-based LiDAR and aerial image data for mobile robot localization in densely forested environments; Hussein, M.; Renner, M.; Watanabe, M.; Iagnemma, K.; Intelligent Robots and Systems (IROS), 2013 IEEE/RSJ International Conference on DOI: 10.1109/IROS.2013.6696537; Publication Year: 2013, pp. 1432-1437.

Modified Hopfield Neural Network Algorithm (MHNNA) for TSS mapping in Penang strait, Malaysia; Kzar, A.A.; MatJafri, M.Z.; Lim, H.S.; Mutter, K.N.; Syahreza, S.; Signal and Image Processing Applications (ICSIPA), 2013 IEEE International Conference on DOI: 10.1109/ICSIPA.2013.6708001; Publication Year: 2013; pp. 187-192.

Aesthetic value characterization of landscapes in coastal zones; Depellegrin, D.; Blazauskas, N.; Vigl, L.E; Baltic International Symposium (BALTIC), 2012 IEEE/OES; DOI: 10.1109/BALTIC.2012.6249166; Publication Year: 2012, pp. 1-6.

(56) References Cited

OTHER PUBLICATIONS

Queue detection using computer image processing; Hoose, N; Road Traffic Monitoring, 1989., Second International Conference on Publication Year: 1989, pp. 94-98.

Locating Subsurface Targets Using Minimal GPR Measurements; Gurbuz, A.C.; McClellan, J.H.; Scott, W.R.; Signal Processing and Communications Applications, 2006 IEEE 14th; DOI: 10.1109/SIU. 2006.1659746; Publication Year: 2006; pp. 1-4.

Multi-UAV-based stereo vision system without GPS for ground obstacle mapping to assist path planning of UGV; Jin Hyo Kim; Ji-Wook Kwon; Jiwon Seo; Electronics Letters; vol. 50, Issue: 20; DOI: 10.1049/el.2014.2227; Publication Year: 2014; pp. 1431-1432.

Ship positioning by matching radar images and map data; Aytac, A.E.; Aksoy, O.; Akgul, Y.S.; Signal Processing and Communications Applications Conference (SIU), 2014 22nd; DOI: 10.1109/SIU. 2014.6830506; Publication Year: 2014; pp. 1423-1426.

Pattern of life for radar port and river security; Silvious, J.; Tahmoush, D.; Homeland Security (HST), 2012 IEEE Conference on Technologies for; DOI: 10.1109/THS.2012.6459921; Publication Year: 2012; pp. 626-630.

Race Technology Speedbox 200Hz non-contact speed sensor brochure; Race Technology, Ltd., Strelley Hall, Main Street, Nottingham, England NG8 6PE (6 pages).

Mercury SmartCraft Operations Manual; This Manual Describes the SmartCraft Tachometer/Speedometer Gauge Systems; Copyright Mercury Marine, 90-898283015-907 (copyright 2007) (88 pages).

http://www.mercurymarine.com/otherproducts/smartcraft/smartcraftinaction/smarttow.php. (2 pages).

"Cruise and Tow with Consistent Control," Mercury SmartCraft DTS SmartTow brochure, copyright 2006, Mercury Marine. (2 pages).

"Understanding Smart Tow Profiles," Mercury SmartCraft DTS (2 pages).

"Smart Tow Pro—The Next Wave in Tow Sport Technology," Mercury SmartCraft DTS Smart Tow Pro (GPS Precision) brochure, copyright 2009, Mercury Marine. (2 pages).

"Mercury Marine Launches Smart Tow Pro for DTS SmartCraft Engines." Mercury News Release, Dec. 18, 2007 (2 pages).

"Power Trip. Hit it with Mercury's New Smart Two Speed Control," Doc Talk brochure (1 page).

\* cited by examiner

WATERCRAFT SPEED CONTROL DEVICE

This patent claims priority from and incorporates by reference U.S. Patent Application Ser. No. 60/543,610, filed Feb. 11, 2004, and is a continuation-in-part of and incorporates by reference U.S. patent application Ser. No. 11/056,848 filed Feb. 11, 2005 which issued as U.S. Pat. No. 7,229,330; U.S. patent application Ser. No. 11/811,616 filed Jun. 11, 2007 which issued as U.S. Pat. No. 7,494,393 on Feb. 24, 2009; U.S. patent application Ser. No. 11/811,605 filed on Jun. 11, 2007 which issued as U.S. Pat. No. 7,491,104 on Feb. 17, 2009; U.S. patent application Ser. No. 11/811,606 filed on Jun. 11, 2007, which issued as U.S. Pat. No. 7,485,021 on Feb. 3, 2009; U.S. patent application Ser. No. 11/811,604 filed on Jun. 11, 2007, which issued as U.S. Pat. No. 7,465,203 on Dec. 16, 2008; U.S. patent application Ser. No. 11/811,617 filed on Jun. 11, 2007, issued as U.S. Pat. No. 7,494,394 on Feb. 24, 2009; U.S. patent application Ser. No. 11/903,208 filed on Sep. 19, 2007; and U.S. patent application Ser. No. 12/391,101 filed on Feb. 23, 2009.

FIELD OF THE INVENTION

The present invention pertains to the field of water sports and boating.

BACKGROUND OF THE INVENTION

Competitors in trick, jump, and slalom ski and wakeboard events require tow boats capable of consistent and accurate speed control. Intricate freestyle tricks, jumps, and successful completion of slalom runs require passes through a competition water course at precisely the same speed at which the events were practiced by the competitors. Some events require that a pass through a course be made at a specified speed. Such requirements are made difficult by the fact that typical watercraft Pitot tube and paddle wheel speedometers are inaccurate and measure speed over water instead of speed over land, and wind, wave, and skier loading conditions constantly vary throughout a competition pass.

Marine transportation in general suffers from the lack of accurate vessel speed control. The schedules of ocean-going vessels for which exact arrival times are required, for example, are vulnerable to the vagaries of wind, waves, and changing hull displacement due to fuel depletion.

SUMMARY OF THE INVENTION

The present invention provides consistent, accurate control of watercraft speed over land. It utilizes velocity measuring device and an inertia based measurement device technology to precisely monitor watercraft velocity over land. It utilizes dynamic monitoring and dynamic updating of engine control data in order to be responsive to real-time conditions such as wind, waves, and loading.

DETAILED DESCRIPTION OF THE EMBODIMENTS

The present invention is an electronic closed-loop feedback system that controls the actual angular velocity $\omega_a$ of a boat propeller, and, indirectly, the actual over land velocity $v_a$ of the watercraft propelled by that propeller. The system has various configurations with one embodiment including a velocity measuring device, an inertia-based measuring device, at least two conversion algorithms, and engine speed controls. Other configurations include a global positioning satellite (GPS) velocity measurement device, a marine engine speed tachometer, comparators, conversion algorithms, and engine speed controls.

Herein, a GPS device is one of the category of commonly understood instruments that use satellites to determine the substantially precise global position and velocity of an object. Such position and velocity measurements can be used in conjunction with timers to determine an object's instantaneous velocity and average velocity between two points. A velocity measuring device is one of a category of commonly understood instruments that is capable of measuring the velocity of an object for example, a GPS device, a paddle wheel, or a pitot tube. An inertia based measurement device is one of a category of commonly understood instruments that is capable of measuring the acceleration of an object. The velocity of an object can be calculated by integrating the acceleration of an object over time. Engine speed refers to angular velocity, generally measured with a device herein referred to as a tachometer. A comparator is any analog or digital electrical, electronic, mechanical, hydraulic, or fluidic device capable of determining the sum of or difference between two input parameters, or the value of an input relative to a predetermined standard. An algorithm is any analog or digital electrical, electronic, mechanical, hydraulic, or fluidic device capable of performing a computational process. The algorithms disclosed herein can be performed on any number of devices commonly called microprocessors or microcontrollers, examples of which include the Motorola® MPC555 and the Texas Instruments® TMS320.

Figure 1:
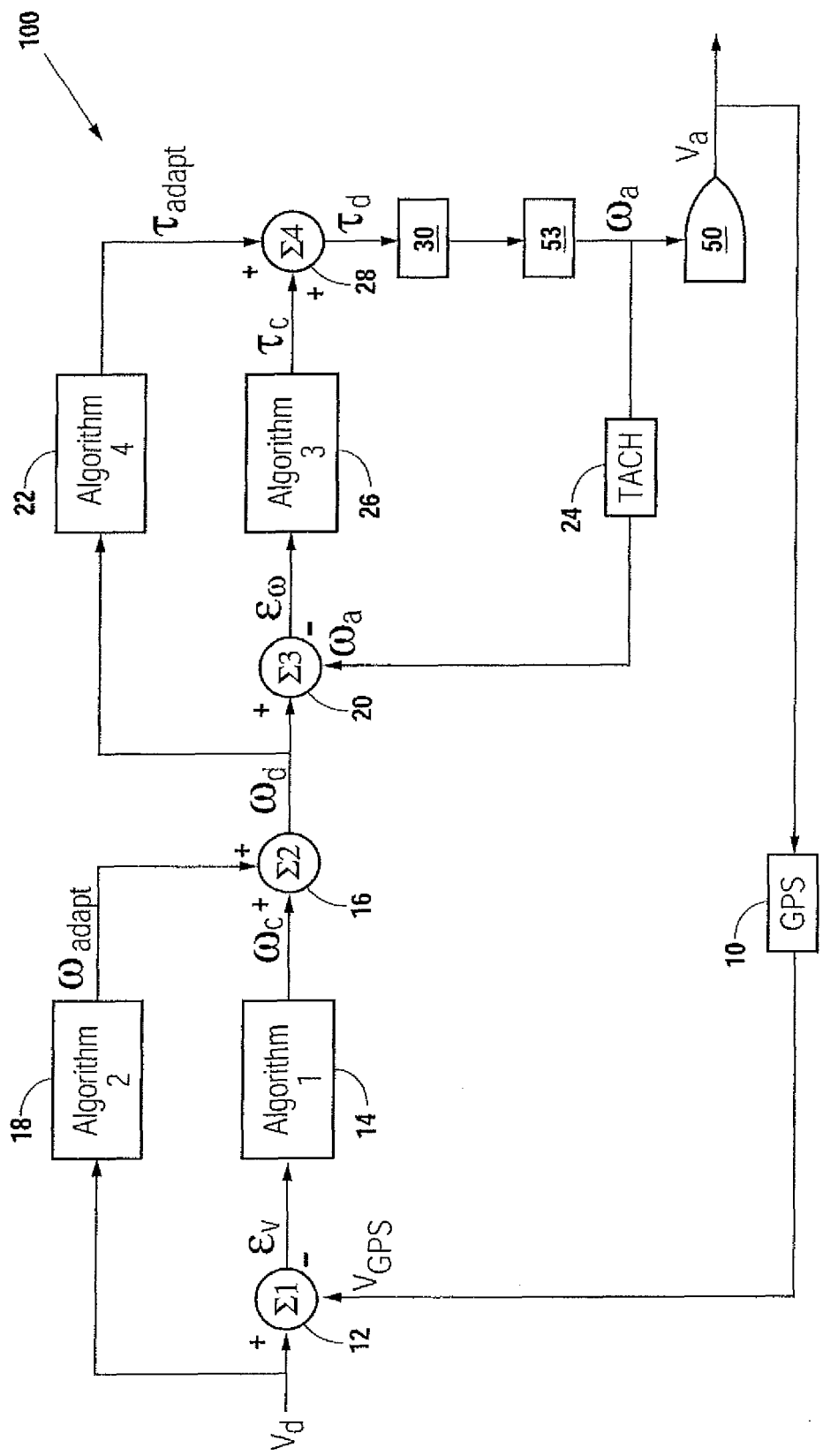
FIG. 1 is a flow diagram of an embodiment of the present invention.

As diagrammed in FIG. 1 showing feedback system 100, GPS device 10 measures the actual velocity $v_a$ of a watercraft 50. The GPS output $v_{GPS}$ is compared in first comparator 12 to predetermined velocity $v_d$. Comparator 12 output velocity error $\epsilon_v$ is input to an algorithm 14 that converts $\epsilon_v$ to engine speed correction $\omega_c$ that is input to a second comparator 16. Predetermined velocity $v_d$ is input to an algorithm 18 the output of which is $\omega_{adapt}$, a value of engine speed adaptively determined to be the engine speed necessary to propel watercraft 50 at predetermined velocity $v_d$ under the prevailing conditions of wind, waves, and watercraft loading, trim angle, and attitude.

The addition of engine speed correction $\omega_c$ and engine speed $\omega_{adapt}$ in comparator 16 results in the total desired engine speed $\omega_d$ that is input to a third comparator 20. A sensor 24, one of many types of commonly understood tachometers, detects the actual angular velocity $\omega_a$ of a driveshaft from an engine 53 of watercraft 50 and sends it to third comparator 20. In comparator 20 actual angular velocity $\omega_a$ and total desired engine speed $\omega_d$ are compared for engine speed error $\epsilon_\omega$ that is input to an algorithm 26. In the algorithm 26 engine speed error $\epsilon_\omega$ is converted into engine torque correction $\tau_c$.

Total desired engine speed $\omega_d$ is also input to an algorithm 22 the output of which is $\tau_{adapt}$, a value of engine torque adaptively determined to be the engine torque necessary to operate watercraft engine 53 at total desired engine speed $\omega_d$. The addition of engine torque $\tau_{adapt}$ and engine torque correction $\tau_c$ in a fourth comparator 28 results in the calculated desired engine torque $\tau_d$. Calculated desired engine torque $\tau_d$ is input to controller 30 that drives a throttle control capable of producing in engine 53 a torque substantially equal to calculated desired engine torque $\tau_d$.

The algorithms 14 and 26, respectively, could include any common or advanced control loop transfer function including, but not limited to, series, parallel, ideal, interacting, noninteracting, analog, classical, and Laplace types. For both the algorithms 14 and 26 the embodiment utilizes a simple proportional-integral-derivative (PID) algorithm of the following type (exemplified by the algorithm 14 transfer function):

$$\omega_c = K_p \epsilon_v + K_d (d/dt) \epsilon_v + \int K_I \epsilon_v dt.$$

Where $K_p$, $K_d$, and $K_I$ are, respectively, the appropriate proportional, derivative, and integral gains.

The algorithms 18 and 22, respectively, provide dynamically adaptive mapping between an input and an output. Such mapping can be described as self-modifying. The inputs to the algorithms 18 and 22 are, respectively, predetermined velocity $v_d$ and total desired engine speed $\omega_d$. The outputs of the algorithms 18 and 22 are, respectively, engine speed $\omega_{adapt}$ and engine torque $\tau_{adapt}$. The self-modifying correlations of algorithms 18 and 22 may be programmed during replicated calibration operations of a watercraft through a range of velocities in a desired set of ambient conditions including, but not limited to, wind, waves, and watercraft loading, trim angle, and attitude. Data triplets of watercraft velocity, engine speed, and engine torque are monitored with GPS technology and other commonly understood devices and fed to algorithms 18 and 22 during the calibration operations. Thereafter, a substantially instantaneous estimate of the engine speed required to obtain a desired watercraft velocity and a substantially instantaneous estimate of the engine torque required to obtain a desired engine speed can be fed to the engine speed and torque control loops, even in the absence of watercraft velocity or engine speed departures from desired values, in which cases the outputs of algorithms 14 and 26 may be zero.

Figure 2:
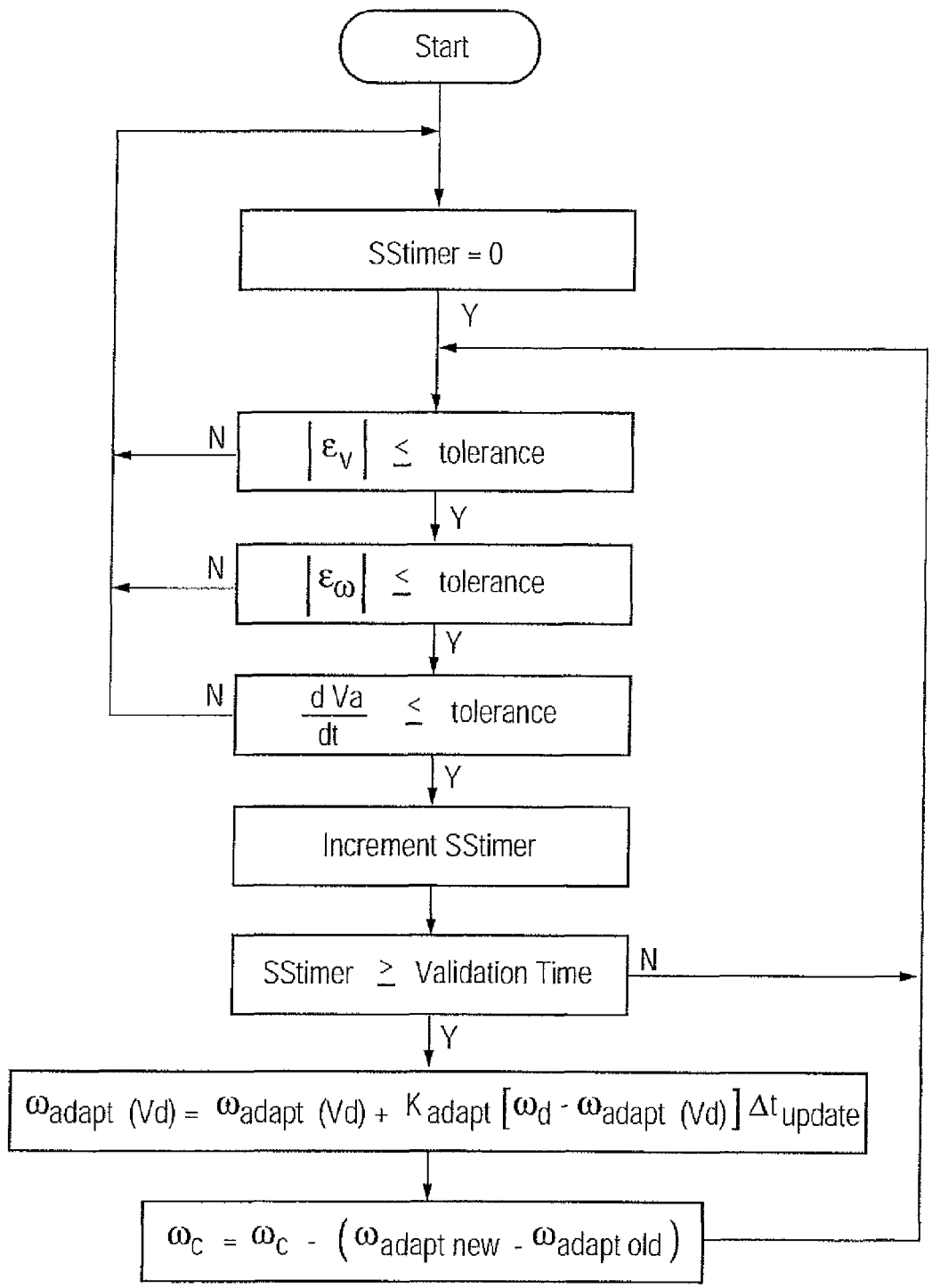
FIG. 2 is a flow chart of the steady state timer algorithm used in the embodiment.

In the embodiment shown in FIG. 1, no adaptive data point of watercraft velocity, engine speed, or engine torque described above is programmed into algorithms 18 or 22 until it has attained a steady state condition as diagrammed in FIG. 2. A timer compares watercraft velocity error $\epsilon_v$, engine speed error $\epsilon_\omega$, the time rate of change of actual watercraft velocity $v_a$, and the time rate of change of actual engine speed $\omega_a$ to predetermined tolerance values. When the absolute value of each variable is less than or equal to its predetermined tolerance, and the time elapsed since the beginning of a sample event is greater than or equal to a predetermined validation time, $\omega_{adapt}$ is updated according to $$\omega_{adapt}(v_d) = \omega_{adapt}(v_d) + k_{adapt}[\omega_{adapt}(v_d)]\Delta t_{update}$$

where $k_{adapt}$ and $\Delta t_{update}$ are factory-set parameters that together represent the speed at which the adaptive algorithms "learn" or develop a correlated data set. The last block on the FIG. 2 flowchart represents a correction to speed control algorithm 14. The correction may be used to smooth iterations that may be present if algorithm 14 uses integrator action.

When engine speed error $\epsilon_\omega$ and the time rate of change of actual engine speed $\omega_a$ decrease to predetermined tolerance values, and the time elapsed since the beginning of a sample event is greater than or equal to a predetermined validation time, $\tau_{adapt}$ is updated according to $$\tau_{adapt}(\omega_d) = \tau_{adapt}(\omega_d) + k_{adapt}[\tau_d - \tau_{adapt}(\omega_d)]\Delta t_{update}.$$

This is the same updating equation that is used in algorithm 18, and it is derived in the same manner as is illustrated in FIG. 2. The smoothing technique described above may be used to counter the effects of integrator action in algorithm 26.

The substantially instantaneous estimates of engine speed and torque derived from algorithms 18 and 22 require interpolation among the discrete values programmed during watercraft calibration operation. For practice of the present invention there are many acceptable interpolation schemes, including high-order and Lagrangian polynomials, but the present embodiment utilizes a linear interpolation scheme. For example, algorithm 18 employs linear interpolation to calculate a value of $\omega_{adapt}$ for any predetermined velocity $v_d$. From a programmed table of $v_d$ values from $v_0$ to $v_n$, inclusive of $v_m$, and $\omega_{adapt}$ values from $\omega_0$ to $\omega_n$, inclusive of $\omega_m$, a value of m is chosen so that $v_d \geq v_m$ and $v_d < v_{m+1}$. Algorithm 18 calculates intermediate values of engine speed according to the equation $$\omega_{adapt} = \omega_m + [(v_d - v_m)/(v_{m+1} - v_m)](\omega_{m+1} - \omega_m).$$

Although algorithm 22 could also utilize any of several interpolation schemes, and is not constrained to duplication of algorithm 18, in the present embodiment of the present invention, algorithm 22 calculates $\tau_{adapt}$ using the same linear interpolation that algorithm 18 uses to calculate $\omega_{adapt}$. In order to implement adaptive update algorithm 18 when using a linearly interpolated table of values as the interpolation embodiment, the following procedure can be followed:

Compute a weighting factor x using the following equation:

$$x = [(v_d - v_m)/(v_{m+1} - v_m)]$$

Note that x is always a value between 0 and 1.
Similar to algorithm 18, update the two bracketing values $\omega_m$, $\omega_{m+1}$ in the linear table using the following equations:

$$\omega_m = \omega_m + (1-x)k_{adapt}[\omega_d - \omega_{adapt}]\Delta t_{update}$$

$$\omega_{m+1} = \omega_{m+1} + (x)k_{adapt}[\omega_d - \omega_{adapt}]\Delta t_{update}$$

The other values in the linear table remain unchanged for this particular update, and are only updated when they bracket the operating condition of the engine at some other time. This same procedure can be used on the engine speed vs. torque adaptive table. It should be noted that if algorithm 18 is not present, then $\omega_c$ will equal $\omega_{adapt}$. Likewise if algorithm 22 is not present then $\tau_c$ will equal $\tau_{adapt}$.

Although the embodiment shown in FIG. 1 does not utilize extrapolation in its adaptive algorithms, the scope of the present invention could easily accommodate commonly understood extrapolation routines for extension of the algorithm 18 and algorithm 22 data sets.

Adaptive algorithms 18 and 22 are not required for operation of the present invention, but they are incorporated into the embodiment. Aided by commonly understood integrators, algorithms 14 and 26 are capable of ultimate control of a watercraft's velocity. However, the additional adaptive control provided by algorithms 18 and 22 enhances the overall transient response of system 100.

The following table is an example of the velocity vs. engine speed adaptive table as it might be initialized from the factory. This table is a simple linear table which starts at zero velocity and extends to the maximum velocity of the boat (60 kph) at which the maximum engine speed rating (6000 rpm) is also reached:

| $v_d$ (kph) | $\omega_{adapt}$ (rpm) |
|---|---|
| 0 | 0 |
| 10 | 1000 |
| 20 | 2000 |
| 30 | 3000 |
| 40 | 4000 |
| 50 | 5000 |
| 60 | 6000 |

The following is an example of the velocity vs. engine speed adaptive after the boat has been driven for a period of time:

| $v_d$ (kph) | $\omega_{adapt}$ (rpm) |
|---|---|
| 0 | 0 |
| 10 | 1080 |
| 20 | 1810 |
| 30 | 2752 |
| 40 | 3810 |
| 50 | 5000 |
| 60 | 6000 |

Figure 4:
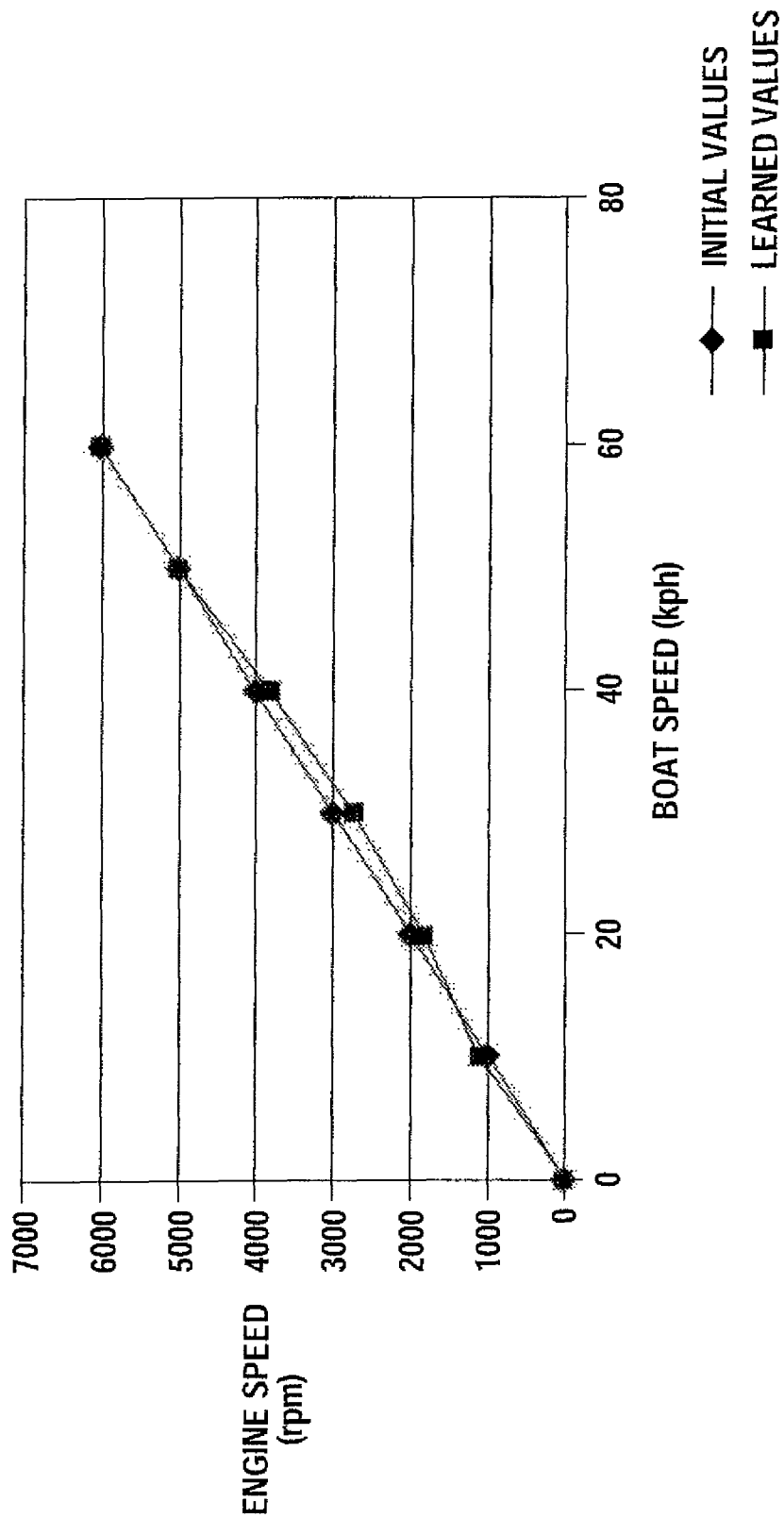
FIG. 4 is a graphical representation of the engine speed and boat speed data shown in the tables herein.

Note that the engine speed values correlating to boat speeds of 50 and 60 kph have not been modified from the original initial values. This is because the boat was never operated at these desired speeds during the period of operation between the present table and the initial installation of the controller. FIG. 4 is a graphical representation of the data in the preceding tables.

Controller 30 (see FIG. 1) is the interface between calculated desired engine torque $\tau_d$ and the throttle control that causes the ultimate changes in engine speed. Controller 30 may interpose any number of relationships between calculated desired engine torque $\tau_d$ and engine speed, but the embodiment of the present invention utilizes a direct proportionality. Other embodiments of the present invention could use controller 30 to adjust engine parameters other than throttle setting. Such parameters could include spark timing, fuel flow rate, or air flow rate. The embodiment of the present invention contemplates a boat with a single speed transmission and a fixed pitch propeller. An alternate embodiment of the present invention could be used with boats having variable transmissions and/or variable pitch propellers. In these alternate embodiments, the controller 30 could adjust the transmission, pitch of the propeller, throttle setting, or a combination thereof.

Figure 3:
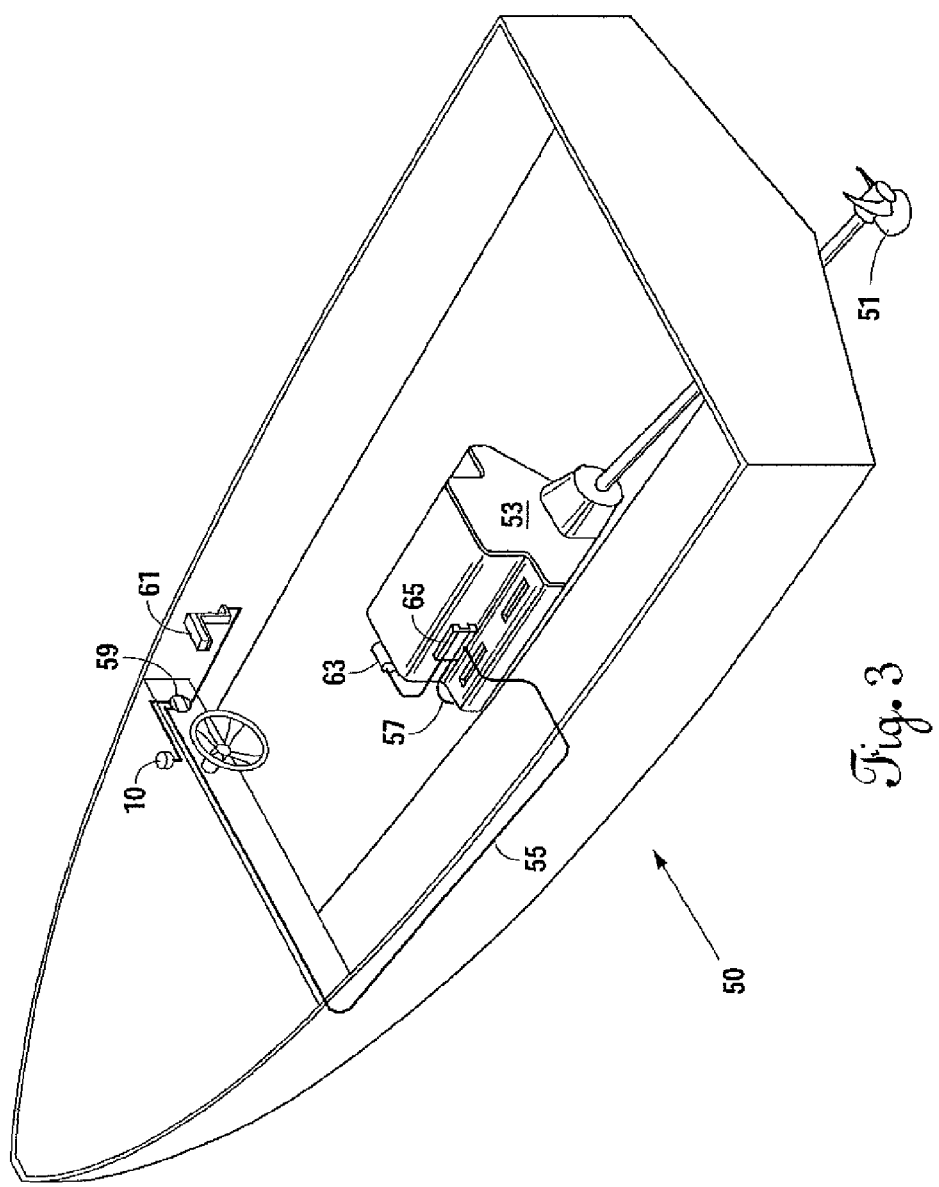
FIG. 3 is a schematic of a watercraft utilizing an embodiment of the present invention.

FIG. 3 illustrates how an operator of watercraft 50 controls the speed of engine 53 and propeller 51. The operator supplies predetermined and desired velocity $v_d$ through a control input device such as control keypad and display unit 59 to control module 65 that houses the algorithms and comparators of system 100. GPS measurements from device 10 and predetermined velocity $v_d$ values are sent to control module 65 via communications link 55. Communication link 57 feeds engine speed measurements from a tachometer to control module 65. System 100 may be overridden at any time through operator control of manual throttle control 61 that controls engine throttle 63.

Figure 5:
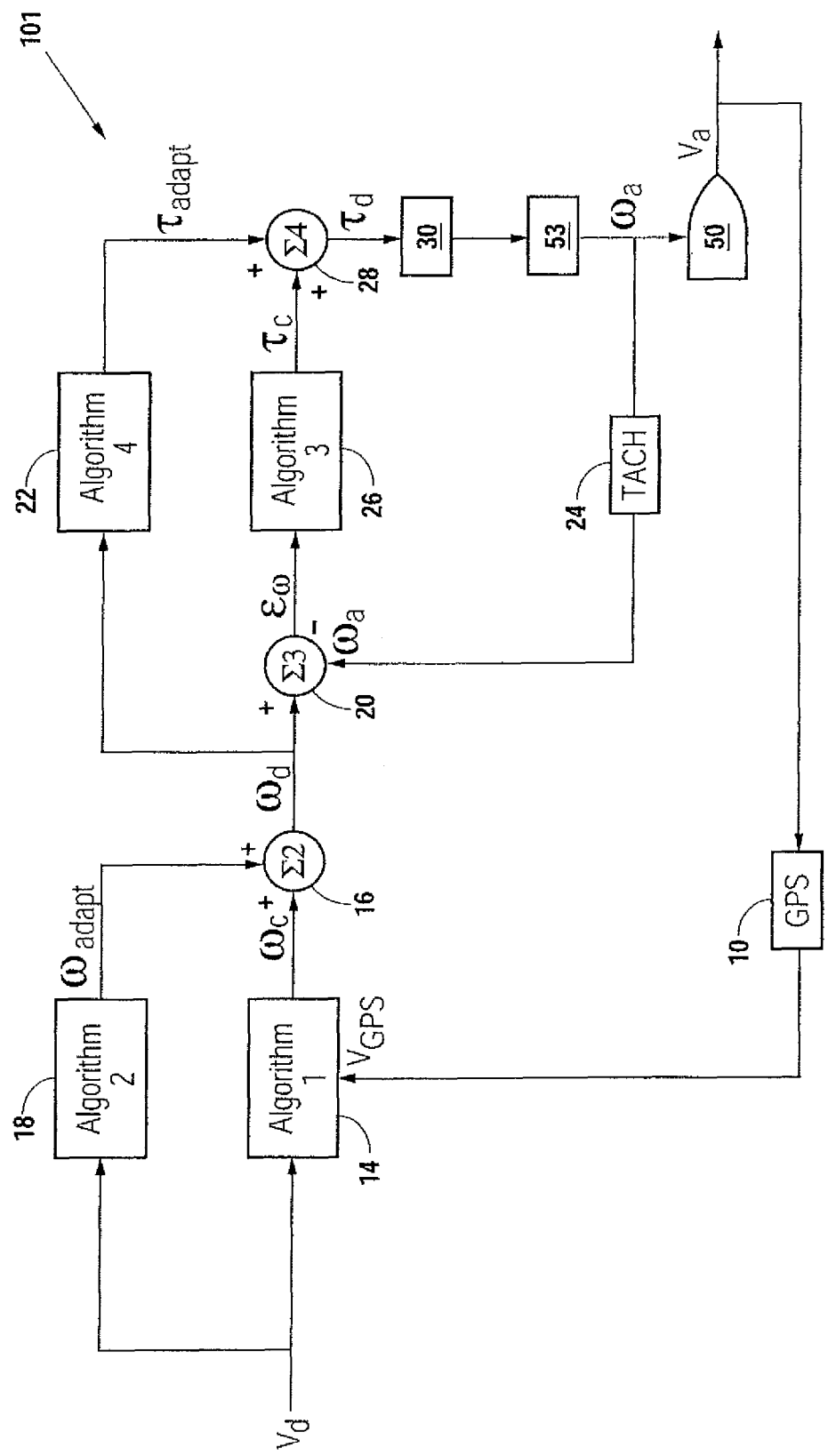
FIG. 5 is a flow diagram of an alternate embodiment of the present invention.

Diagrammed in FIG. 5 is feedback system 101 which is an alternate embodiment of the present invention. In this embodiment, the comparator 12 is removed from system 101. The velocity measurement determined by the GPS device 10 is fed directly to algorithm 14. Algorithm 14 is modified to incorporate predetermined velocity $v_d$ and GPS output $v_{GPS}$ in the calculation to determine engine speed correction $\omega_c$.

Figure 6:
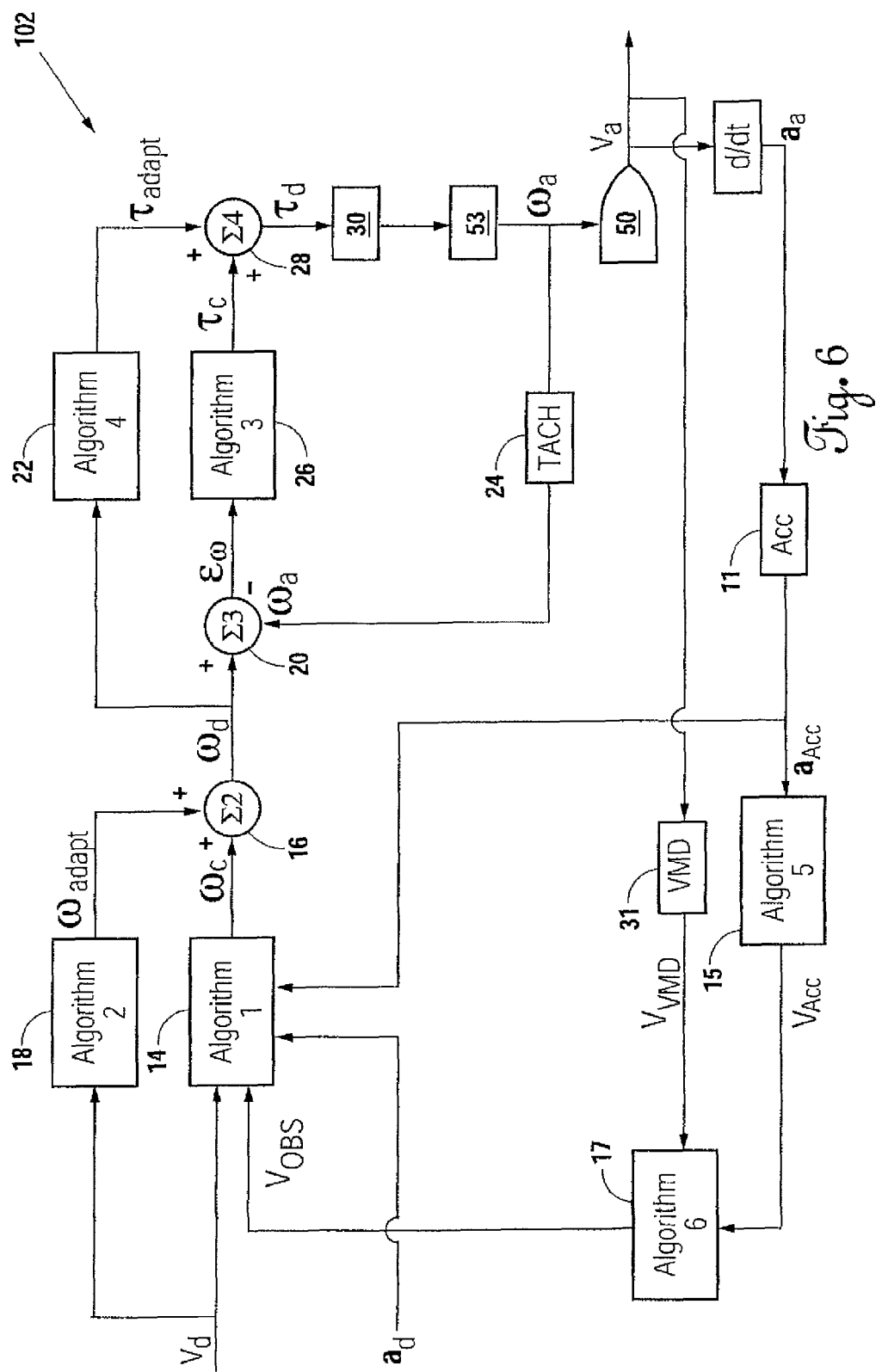
FIG. 6 is a flow diagram of another embodiment of the present invention.

Diagrammed in FIG. 6 is feedback system 102 which is another embodiment of the present invention. In this embodiment, system 102 incorporates an inertia measuring device 11, an algorithm 15, an algorithm 17, and a velocity measuring device 31. The inertia measuring device 11 measures the actual acceleration $a_{Acc}$ of a watercraft 50 and the velocity measuring device 31 measures the actual velocity $v_{VMD}$ of the same watercraft 50. The output of the inertia measuring device 11 is input into algorithm 15 that converts actual acceleration $a_{Acc}$ to velocity $v_{Acc}$ according to the formula $$v_{Acc} = \int a_{Acc} dt$$

The output from algorithm 15 velocity $v_{Acc}$ and velocity $v_{VMD}$ are input into algorithm 17 which calculates observed velocity $v_{OBS}$ according to the formula $$v_{OBS} = K_P(v_{VMD} - v_{Acc}) K_D(d/dt)(v_{VMD} - v_{Acc}) = \int K_i (v_{VMD} - v_{Acc})$$

In this embodiment algorithm 14 is modified to incorporate predetermined velocity $v_d$, observed velocity $v_{OBS}$, actual acceleration $a_{Acc}$, and predetermined acceleration $a_d$ in the calculation to determine engine speed correction $\omega_c$.

Figure 7:
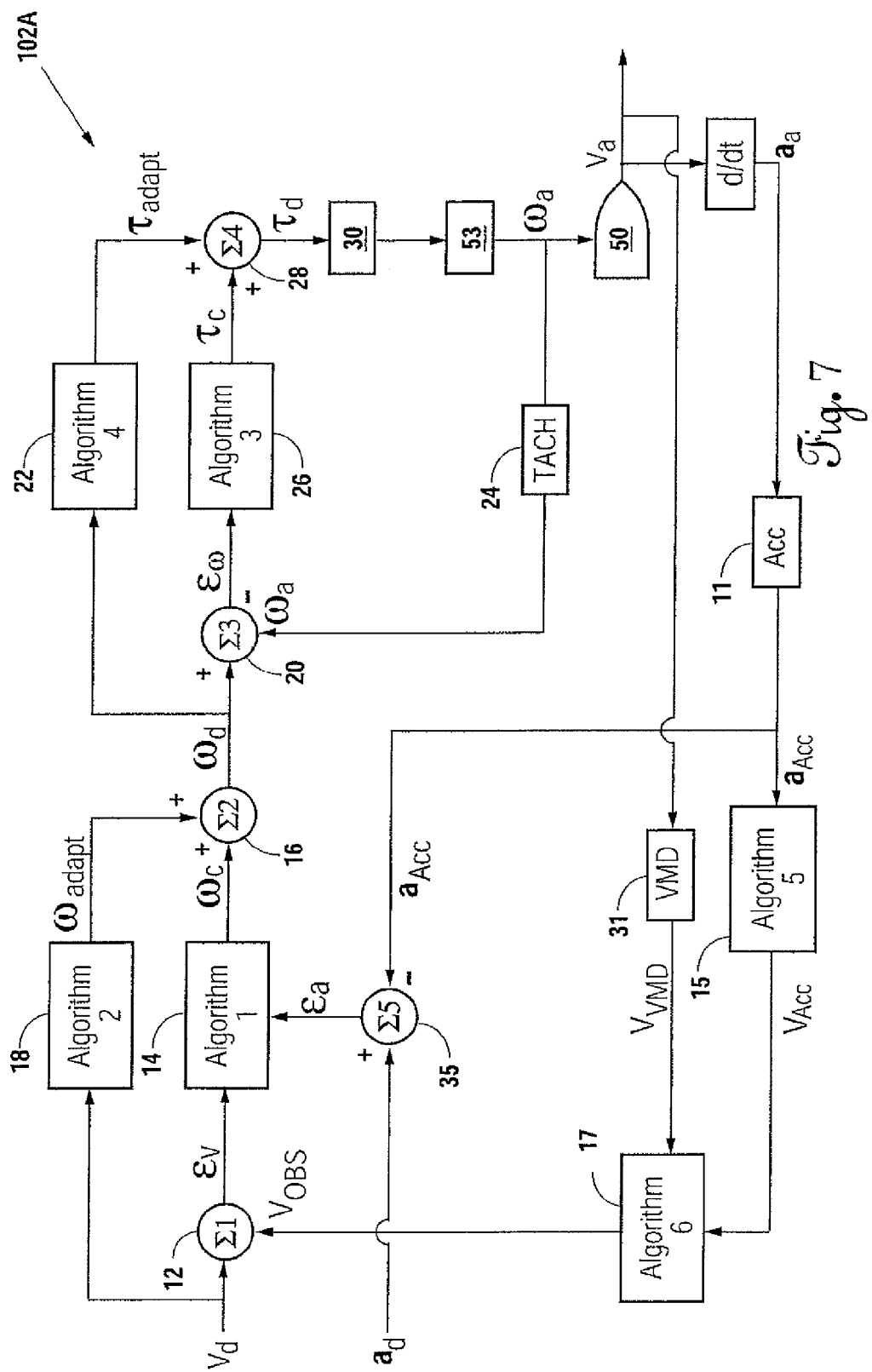
FIG. 7 is a flow diagram of an alternate embodiment of the present invention.

As shown in FIG. 7, for feedback system 102 it is also possible to incorporate a comparator to determine the velocity magnitude difference between the desired velocity $v_d$ and the observed velocity $v_{OBS}$. Likewise, it is possible to incorporate another comparator to determine the acceleration magnitude difference between the desired acceleration $a_d$ and actual acceleration $a_{Acc}$. The algorithm 14 would be modified to incorporate the velocity magnitude difference and the acceleration magnitude difference in the calculation to determine engine speed correction $\omega_c$.

For system 102 and other systems which incorporates the use of a inertia measuring device, the algorithms 14 and 26, respectively, could include any common or advanced control loop transfer function including, but not limited to, series, parallel, ideal, interacting, noninteracting, analog, classical, and Laplace types. For both the algorithms 14 and 26 the embodiment utilizes a simple proportional-integral-derivative (PID) algorithm of the following type (exemplified by the algorithm 14 transfer function):

$$\omega_c = K_p \epsilon_v + K_d \epsilon_a + \int K_i \epsilon_v dt.$$

Where $K_p$, $K_d$, and $K_i$ are, respectively, the appropriate proportional, derivative, and integral gains.

Figure 8:
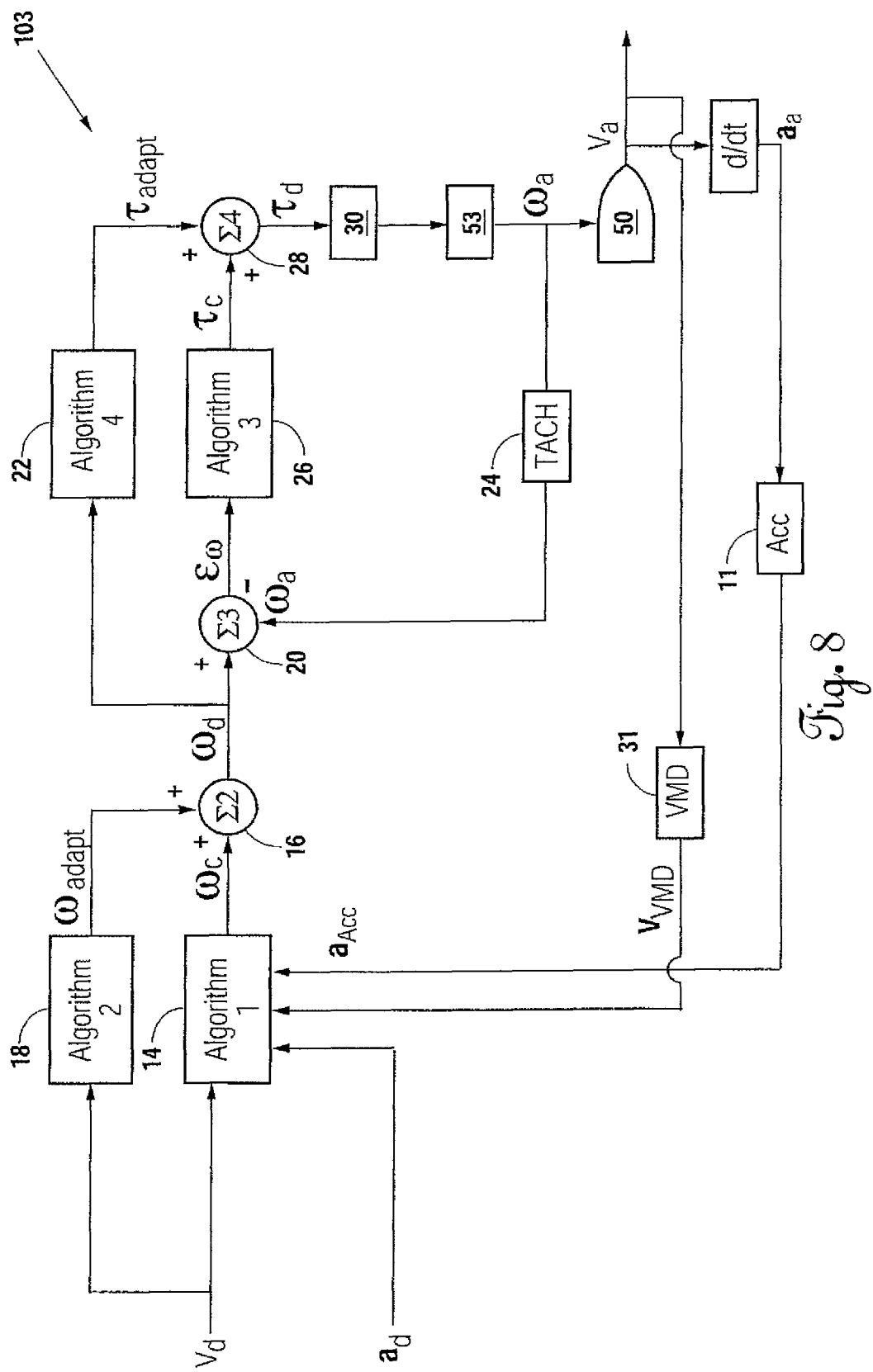
FIG. 8 is a flow diagram of another embodiment of the present invention.

Diagrammed in FIG. 8 is feedback system 103 which is an alternate embodiment of the present invention. In this embodiment, system 103 incorporates an inertia measuring device 11, and a velocity measuring device 31. The inertia measuring device 11 measures the actual acceleration $a_{Acc}$ of a watercraft 50 and the velocity measuring device 31 measures the actual velocity $v_{VMD}$ of the same watercraft 50. The algorithm 14 is modified to incorporate desired velocity $v_d$, desired acceleration $a_d$, actual acceleration $a_{Acc}$, and actual velocity $v_{VMD}$ in the calculation to determine engine speed correction $\omega_c$.

Figure 9:
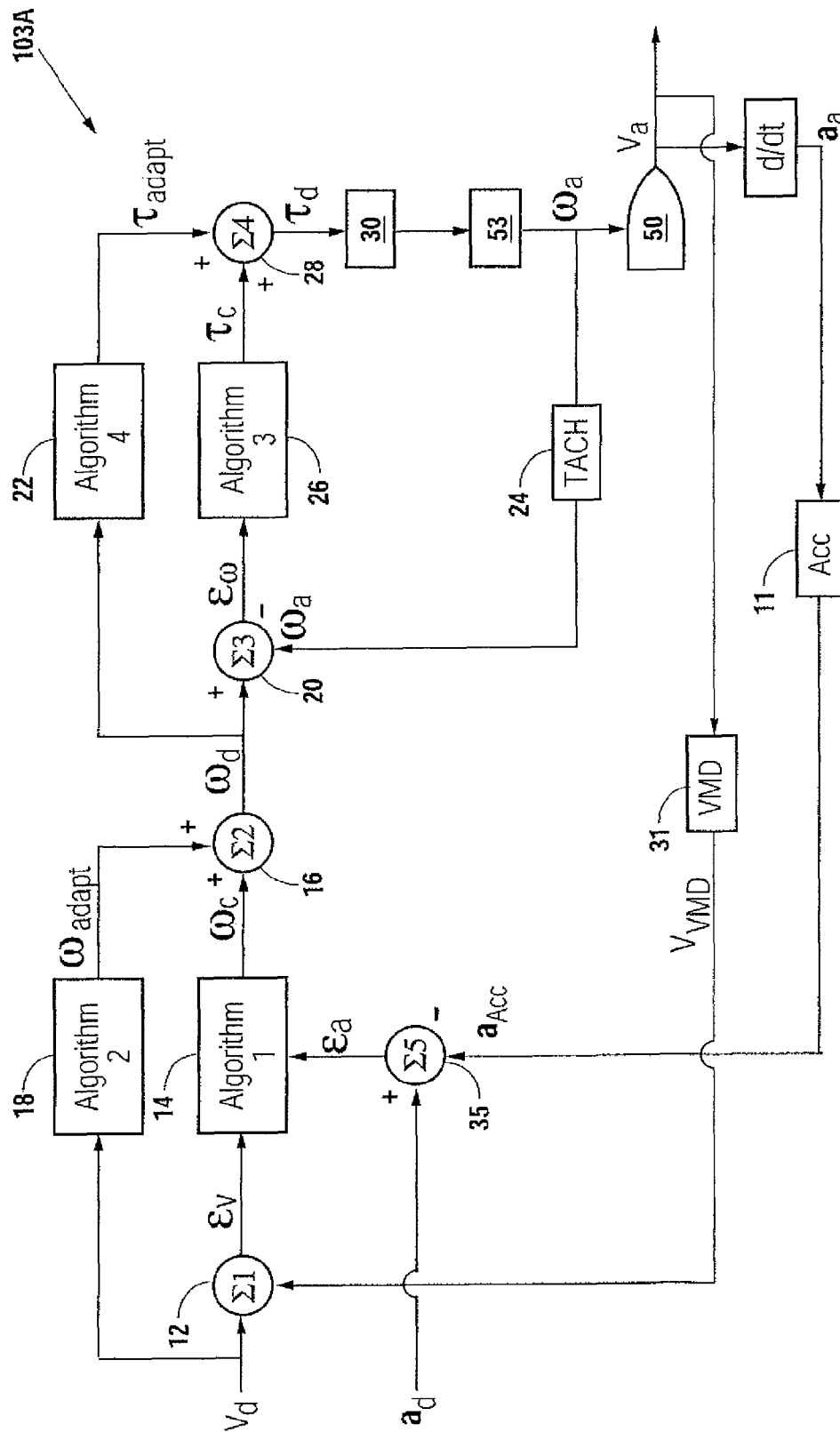
FIG. 9 is a flow diagram of another embodiment of the present invention.

As shown in FIG. 9, for feedback system 103 it is also possible to incorporate a comparator to determine the velocity magnitude difference between the desired velocity $v_d$ and the actual velocity $v_{VMD}$. Likewise, it is possible to incorporate another comparator to determine the acceleration magnitude difference between the desired acceleration $a_d$ and actual acceleration $a_{Acc}$. The algorithm 14 would be modified to incorporate the velocity magnitude difference and the acceleration magnitude difference in the calculation to determine engine speed correction $\omega_c$.

Figure 10:
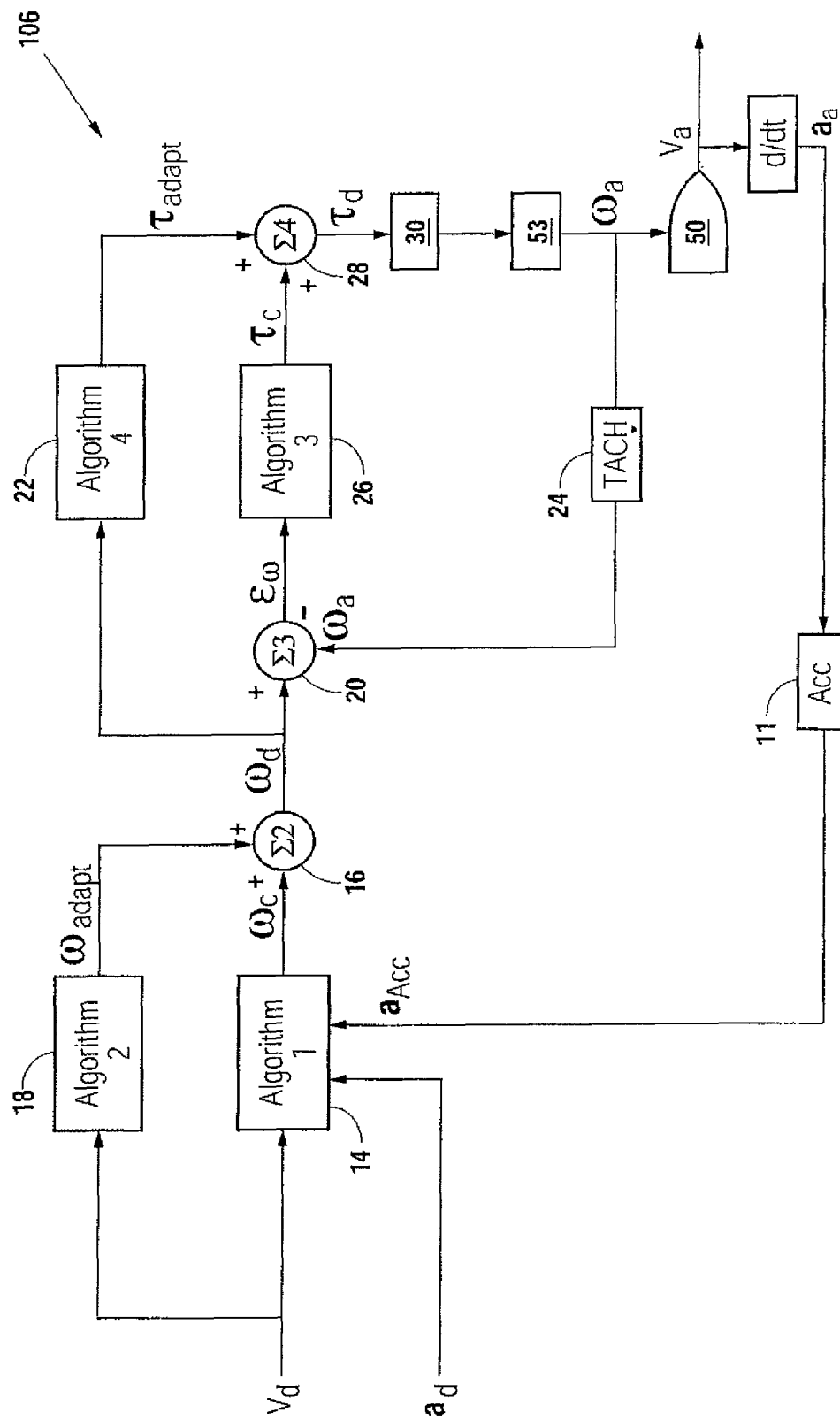
FIG. 10 is a flow diagram of an alternate embodiment of the present invention.

Diagrammed in FIG. 10 is feedback system 106 which is another embodiment of the present invention. In this embodiment, system 106 incorporates an inertia measuring device 11 without a velocity measuring device. The inertia measuring device 11 measures the actual acceleration $a_{Acc}$ of a watercraft 50. The algorithm 14 is modified to incorporate desired velocity $v_d$, desired acceleration $a_d$, and actual acceleration $a_{Acc}$ in the calculation to determine engine speed correction $\omega_c$.

Figure 11:
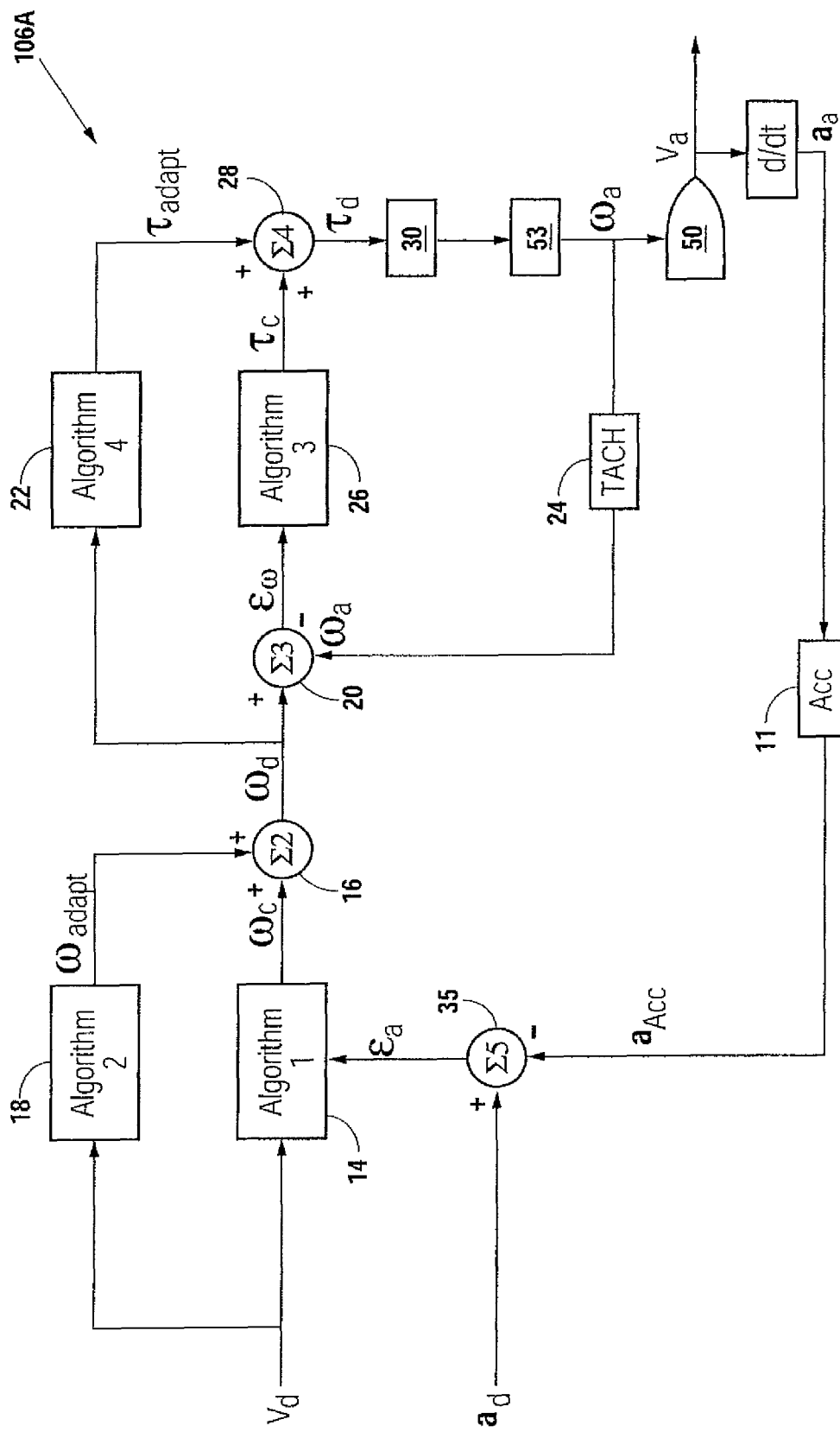
FIG. 11 is a flow diagram of another embodiment of the present invention.

As shown in FIG. 11, for feedback system 106 it is also possible to incorporate a comparator to determine the acceleration magnitude difference between the desired acceleration $a_d$ and actual acceleration $a_{Acc}$. The algorithm 14 would be modified to incorporate the acceleration magnitude difference in the calculation to determine engine speed correction $\omega_c$.

Figure 12:
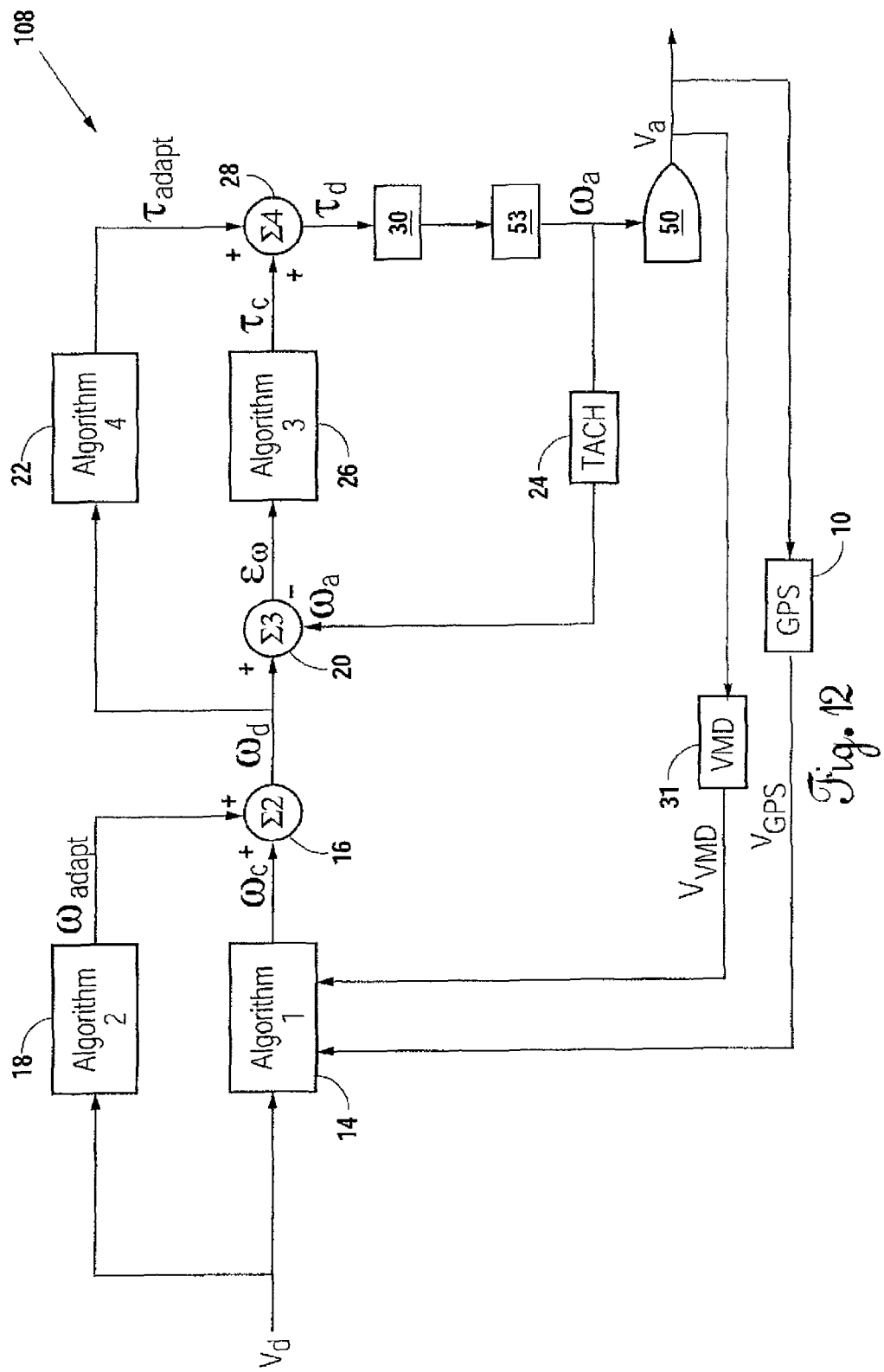
FIG. 12 is a flow diagram of an alternate embodiment of the present invention.

Diagrammed in FIG. 12 is feedback system 108 which is another embodiment of the present invention. In this embodiment, system 108 incorporates a velocity measuring device 31 and a GPS device 10 both of which capable of measuring the velocity of watercraft 50. The velocity measuring device measures velocity $v_{VMD}$ and the GPS device measures velocity $v_{GPS}$ of the same watercraft 50. In this embodiment, algorithm 14 is modified to incorporate desired velocity $v_d$, velocity $v_{VMD}$, and velocity $v_{GPS}$ in the calculation to determine engine speed correction $\omega_c$.

Figure 13:
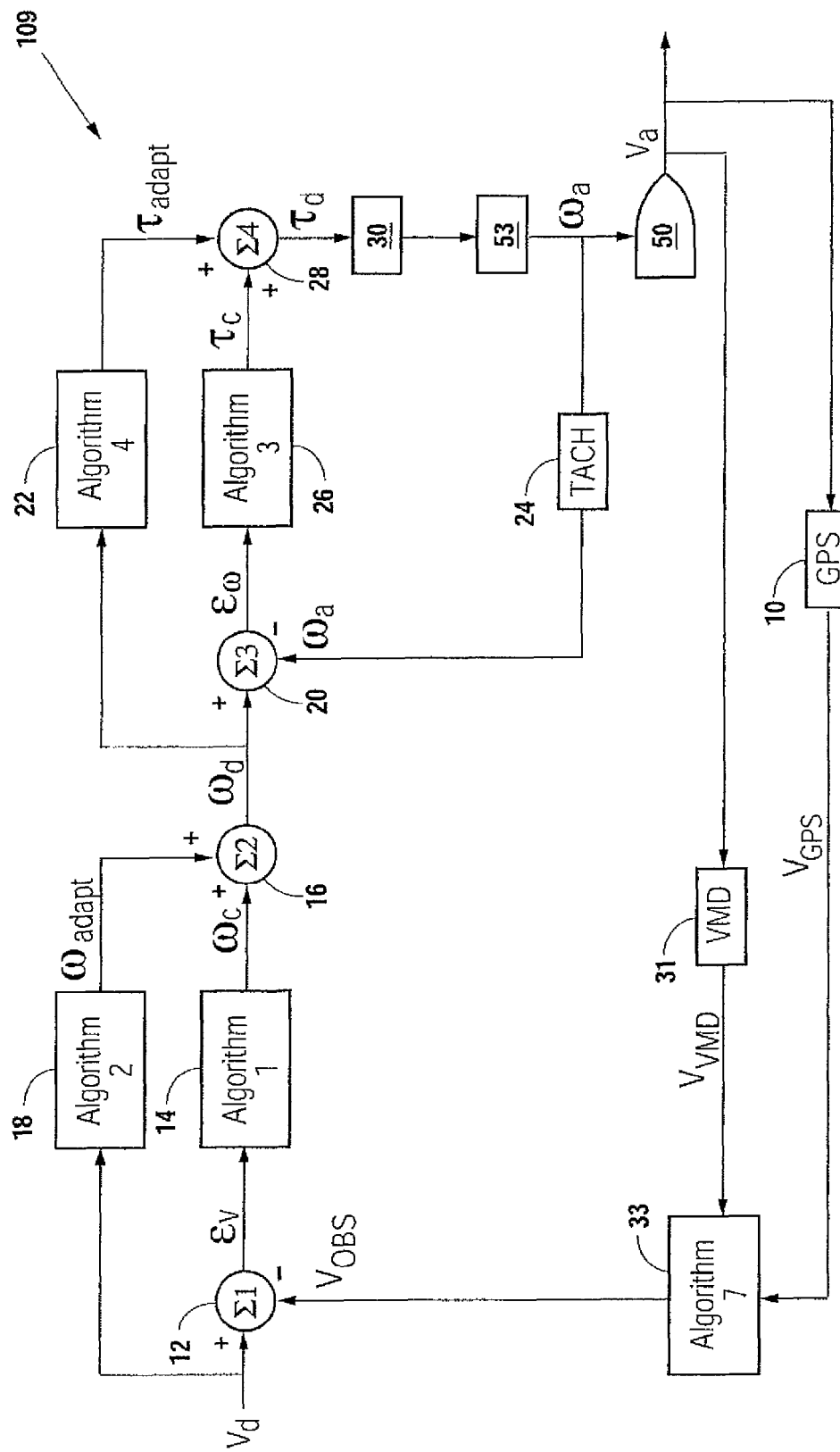
FIG. 13 is a flow diagram of another embodiment of the present invention.

Diagrammed in FIG. 13 is feedback system 109 which incorporates an algorithm 17 and comparator 12. The output of the velocity measuring device 31 $v_{VMD}$ and the output of the GPS device measures velocity $v_{GPS}$ are input into algorithm 17 which calculates observed velocity $v_{OBS}$ according to the formula $$v_{OBS}=K_P(v_{VMD}-v_{GPS})+K_D(d/dt)(v_{VMD}-v_{GPS})=\int K_i (v_{VMD}-v_{GPS})$$

Observed velocity $v_{OBS}$ may be sent to either comparator 12 or algorithm 14. If observed velocity $v_{OBS}$ is sent to comparator 12, then comparator 12 determines the velocity magnitude difference between the desired velocity $v_d$ and the observed velocity $v_{OBS}$. Comparator 12 output velocity error $\epsilon_v$ is input to an algorithm 14 that converts $\epsilon_v$ to engine speed correction $\omega_c$ that is input to a second comparator 16. If observed velocity $v_{OBS}$ is sent to algorithm 14, in this embodiment algorithm 14 is modified to incorporate predetermined velocity $v_d$ and observed velocity $v_{OBS}$ in the calculation to determine engine speed correction $\omega_c$.

It will be apparent to those with ordinary skill in the relevant art having the benefit of this disclosure that the present invention provides an apparatus for controlling the velocity of a watercraft. It is understood that the forms of the invention shown and described in the detailed description and the drawings are to be taken merely as examples and that the invention is limited only by the language of the claims. The drawings and detailed description presented herein are not intended to limit the invention to the particular embodiments disclosed. While the present invention has been described in terms of alternate embodiments and a few variations thereof, it will be apparent to those skilled in the art that form and detail modifications can be made to that embodiment without departing from the spirit or scope of the invention.

We claim:

1. A system for controlling the velocity of a watercraft having an engine for propulsion, the system comprising:
   a velocity measuring device configured to obtain a velocity measuring device measurement of a velocity magnitude of a watercraft;
   an inertia measuring device configured to obtain an inertia measuring device measurement of an acceleration of the watercraft;
   a control input device configured to accept an input from a user of a predetermined desired velocity of the watercraft and an input from the user of a predetermined desired acceleration of the watercraft; and
   a control module comprising:
      a velocity comparator configured to determine a velocity magnitude difference between the predetermined desired velocity of the watercraft and the velocity measuring device measurement of the velocity magnitude of the watercraft;
      an acceleration comparator configured to determine an acceleration magnitude difference between the predetermined desired acceleration of the watercraft and the inertia measuring device measurement of the acceleration of the watercraft; and
      an engine speed algorithm configured to create a first engine speed output correction from the velocity magnitude difference and the acceleration magnitude difference, wherein the engine speed output correction causes the watercraft to be propelled at substantially the predetermined desired velocity according to the predetermined desired acceleration.

2. The system as in claim 1 further comprising:
   a tachometer device configured to measure a tachometer speed measurement of an engine propelling the watercraft;
   the control module further comprising an engine torque algorithm configured to create a first engine torque output correction from the first engine speed output correction and the tachometer speed measurement, wherein the first engine torque output correction is configured to cause the watercraft to be propelled at substantially the predetermined velocity.

3. The system as in claim 2 wherein the control module further comprises:
   an additional engine torque algorithm configured to create a second engine torque output correction corresponding to an input representative of the first engine speed output correction of the engine speed algorithm, the second engine torque output correction representing a dynamic historical value of the torque required to change the engine speed of the engine propelling the watercraft an amount approximately equal to the first engine speed output correction of the engine speed algorithm; and
   a torque comparator configured to sum the first engine torque output correction of the engine torque algorithm and the second engine torque output correction of the additional engine torque algorithm, wherein the sum is configured to cause the watercraft to be propelled at substantially the predetermined velocity.

4. The system as in claim 3 wherein the additional engine torque algorithm is configured to build a table of discrete data pairs of engine speed correction and torque required to produce the engine speed correction as the watercraft is repeatedly operated for calibration over a prevailing set of ambient conditions, and wherein the additional engine torque algorithm is configured to determine interpolated and extrapolated data points among and extending from the data pairs collected during the calibration operation of the watercraft.

5. The system as in claim 4 wherein the additional engine torque algorithm is configured to determine a condition of predetermined change in a predetermined parameter prior to updating the table.

6. The system as in claim 3 wherein said additional engine torque algorithm is capable of building a table of discrete data pairs of engine speed and torque required to produce said engine speed as said watercraft is repeatedly operated for calibration over a prevailing set of ambient conditions, said additional engine torque algorithm being capable of determining interpolated and extrapolated data points among and extending from said data pairs collected during said calibration operation of said watercraft.

7. The system as in claim 6 wherein said additional engine torque algorithm is capable of determining a condition of predetermined change in a predetermined parameter prior to updating said table.

8. The system as in claim 2 wherein the velocity measuring device is selected from the group consisting of a GPS device, a paddle wheel, and a pitot tube.

9. The system as in claim 1 further comprising:
a tachometer device capable of measuring the revolutions per minute of a drive shaft of said engine propelling said watercraft;
said control module further comprising an engine torque algorithm capable of creating a first engine torque output correction from said first engine speed output correction and said tachometer revolutions per minute measurement; and said first engine torque output correction being capable of causing said watercraft to be propelled at substantially said predetermined velocity.

10. The system as in claim 9 wherein said velocity measuring device is selected from the group consisting of a GPS device, a paddle wheel, and a pitot tube.

11. The system as in claim 9 wherein said control module further comprises:
an additional engine torque algorithm capable of creating a second engine torque output correction corresponding to an input representative of said first engine speed output correction of said engine speed algorithm, said second engine torque output correction representing a dynamic historical value of the torque required to change the engine speed of an engine propelling said watercraft an amount approximately equal to said first engine speed output correction of said engine speed algorithm; and
a torque comparator capable of summing said first engine torque output correction of said engine torque algorithm and said second engine torque output correction of said additional engine torque algorithm, said sum being capable of causing said watercraft to be propelled at substantially said predetermined velocity.

12. The system as in claim 1 further comprising:
a tachometer device capable of measuring the speed of said engine propelling said watercraft;
said control module further comprising:
an additional engine speed comparator capable of determining the engine speed error between said first engine speed output correction and said tachometer speed measurement; and
an engine torque algorithm capable of creating a first engine torque output correction from said engine speed error; and said first engine torque output correction being capable of causing said watercraft to be propelled at substantially said predetermined velocity.

13. The system as in claim 12 wherein said velocity measuring device is selected from the group consisting of a GPS device, a paddle wheel, and a pitot tube.

14. The system as in claim 12 wherein said control module further comprises:
an additional engine torque algorithm capable of creating a second engine torque output correction corresponding to an input representative of said first engine speed output correction of said engine speed algorithm, said second engine torque output correction representing a dynamic historical value of the torque required to change the engine speed of an engine propelling said watercraft an amount approximately equal to said first engine speed output correction of said engine speed algorithm; and
a torque comparator capable of summing said first engine torque output correction of said engine torque algorithm and said second engine torque output correction of said additional engine torque algorithm, said sum being capable of causing said watercraft to be propelled at substantially said predetermined velocity.

15. The system as in claim 1 wherein said control module further comprises:
an additional engine speed algorithm capable of creating a second engine speed output correction corresponding to an input representative of said predetermined velocity, said second engine speed output correction representing a dynamic historical value of the speed of an engine propelling said watercraft at a velocity approximately equal to said predetermined velocity; and
an engine speed comparator capable of summing said first engine speed output correction of said engine speed algorithm and said second engine speed output correction of said additional engine speed algorithm; and said sum capable of causing said watercraft to be propelled at approximately said predetermined velocity.

16. The system as in claim 15 wherein said additional engine speed algorithm is capable of building a table of discrete data pairs of velocity magnitude and engine speed of said watercraft as said watercraft is repeatedly operated for calibration over a prevailing set of ambient conditions, said additional engine speed algorithm being capable of determining interpolated and extrapolated data points among and extending from said data pairs collected during said calibration operation of said watercraft.

17. The system as in claim 16 wherein said additional engine speed algorithm is capable of determining a condition of predetermined change in a predetermined parameter prior to updating said table.

18. The system as in claim 15 wherein said velocity measuring device is selected from the group consisting of a GPS device, a paddle wheel, and a pitot tube.

19. The system as in claim 1 wherein the velocity measuring device is selected from the group consisting of a GPS device, a paddle wheel, and a pitot tube.

20. A system for controlling the velocity of a watercraft having an engine for propulsion, the system comprising:

a velocity measuring device configured to obtain a velocity measuring device measurement of a velocity magnitude of a watercraft;

an inertia measuring device configured to obtain an inertia measuring device measurement of an acceleration of the watercraft;

a control input device configured to accept an input from a user of a predetermined desired velocity of the watercraft;

a control input device configured to accept an input from a user of a predetermined desired acceleration of the watercraft;

a tachometer device configured to measure a tachometer speed measurement of an engine propelling the watercraft; and a control module comprising:

a velocity comparator configured to determine a velocity magnitude difference between the predetermined desired velocity of the watercraft and the velocity measuring device measurement of the velocity magnitude of the watercraft;

an acceleration comparator configured to determine an acceleration magnitude difference between the predetermined desired acceleration of the watercraft and the inertia measuring device measurement of the acceleration of the watercraft;

an algorithm configured to create a first engine torque output correction from the tachometer speed measurement, the velocity magnitude difference, and the acceleration magnitude difference, wherein the first engine torque output correction is configured to cause the engine propelling the watercraft to propel the watercraft at substantially the predetermined velocity according to the predetermined acceleration.

21. The system as in claim 20 wherein the velocity measuring device is selected from the group consisting of a GPS device, a paddle wheel, and a pitot tube.

* * * * *